No. 800,266. PATENTED SEPT. 26, 1905.
A. C. CLARK.
STACKER.
APPLICATION FILED JAN. 27, 1905.
3 SHEETS—SHEET 1.
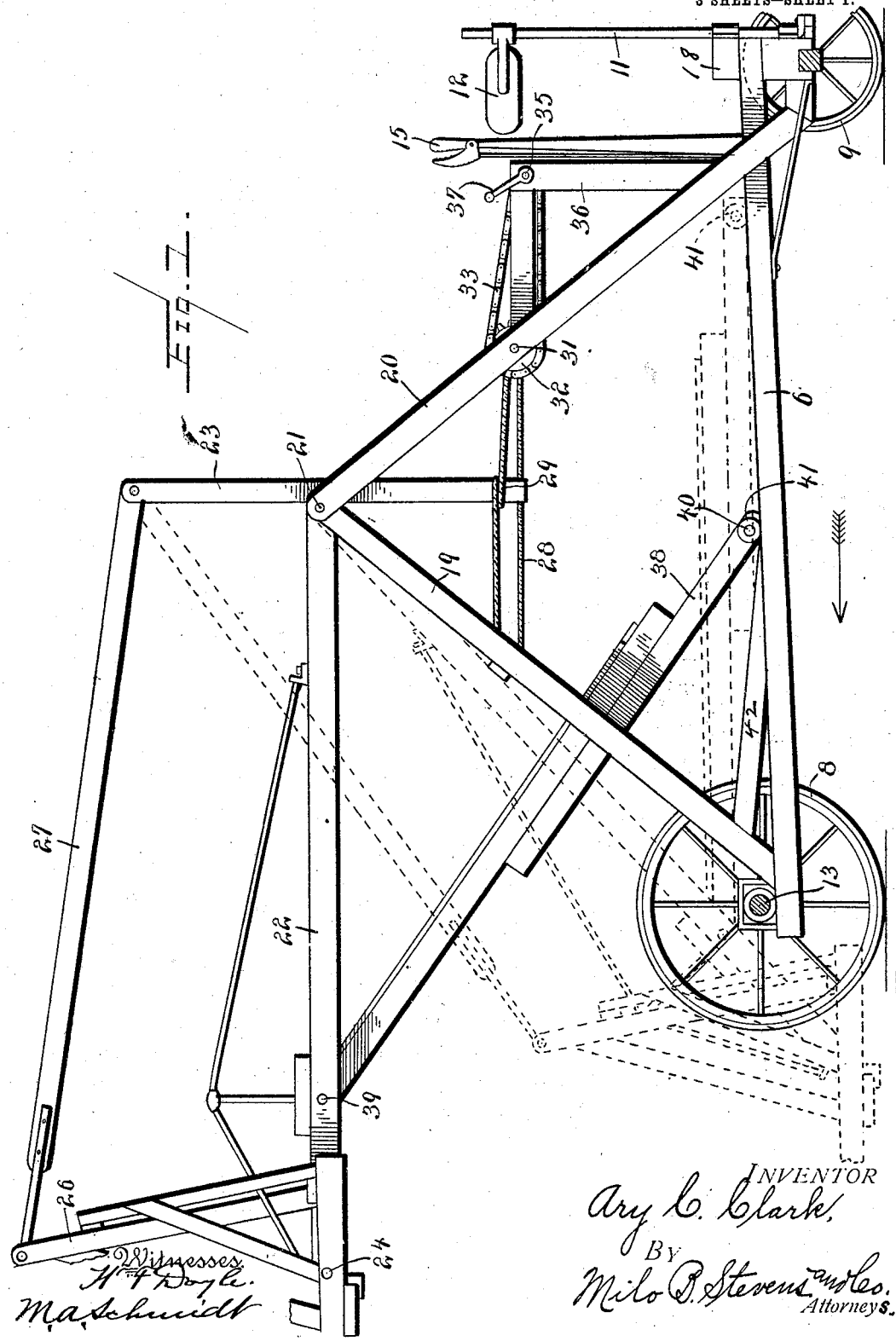

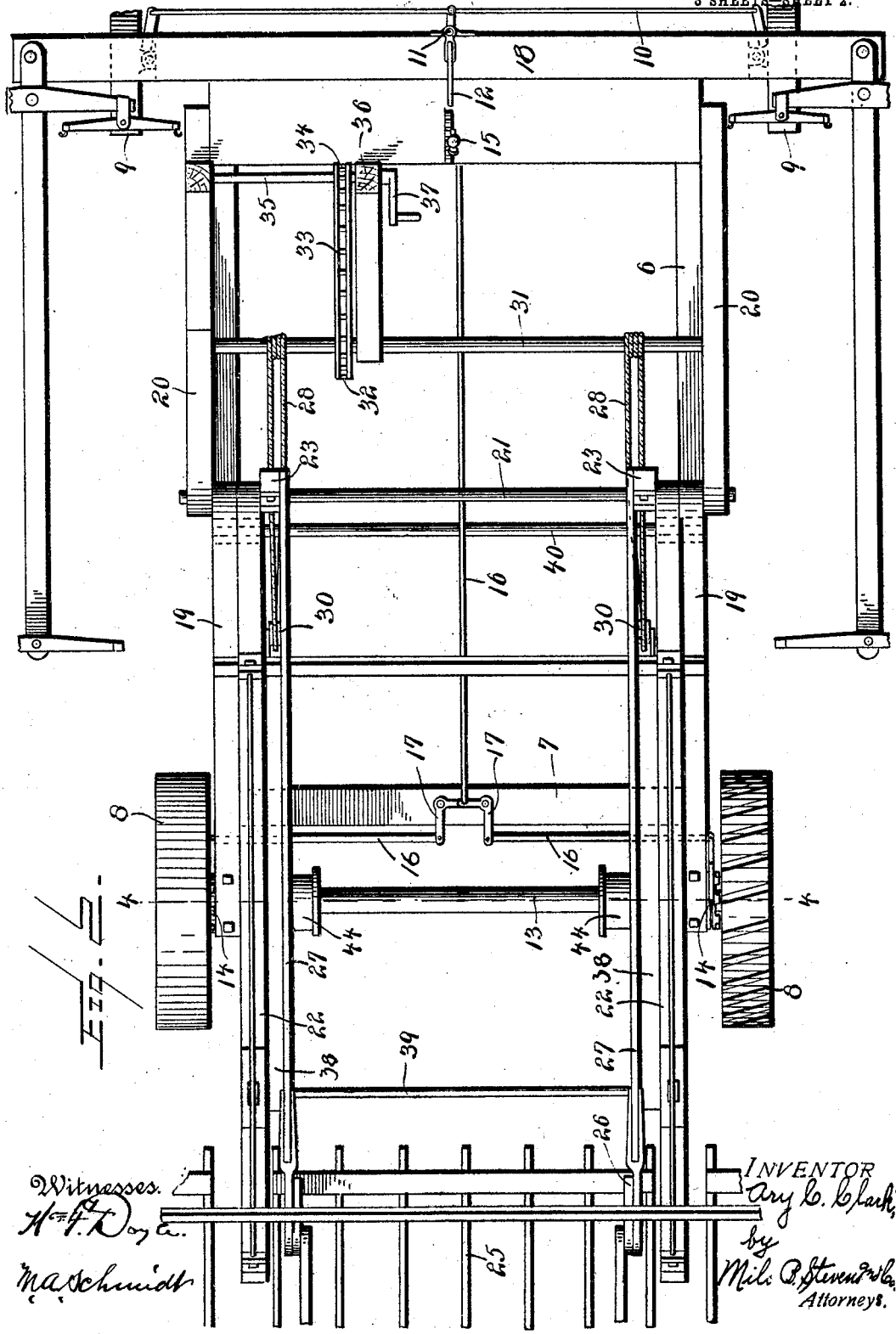

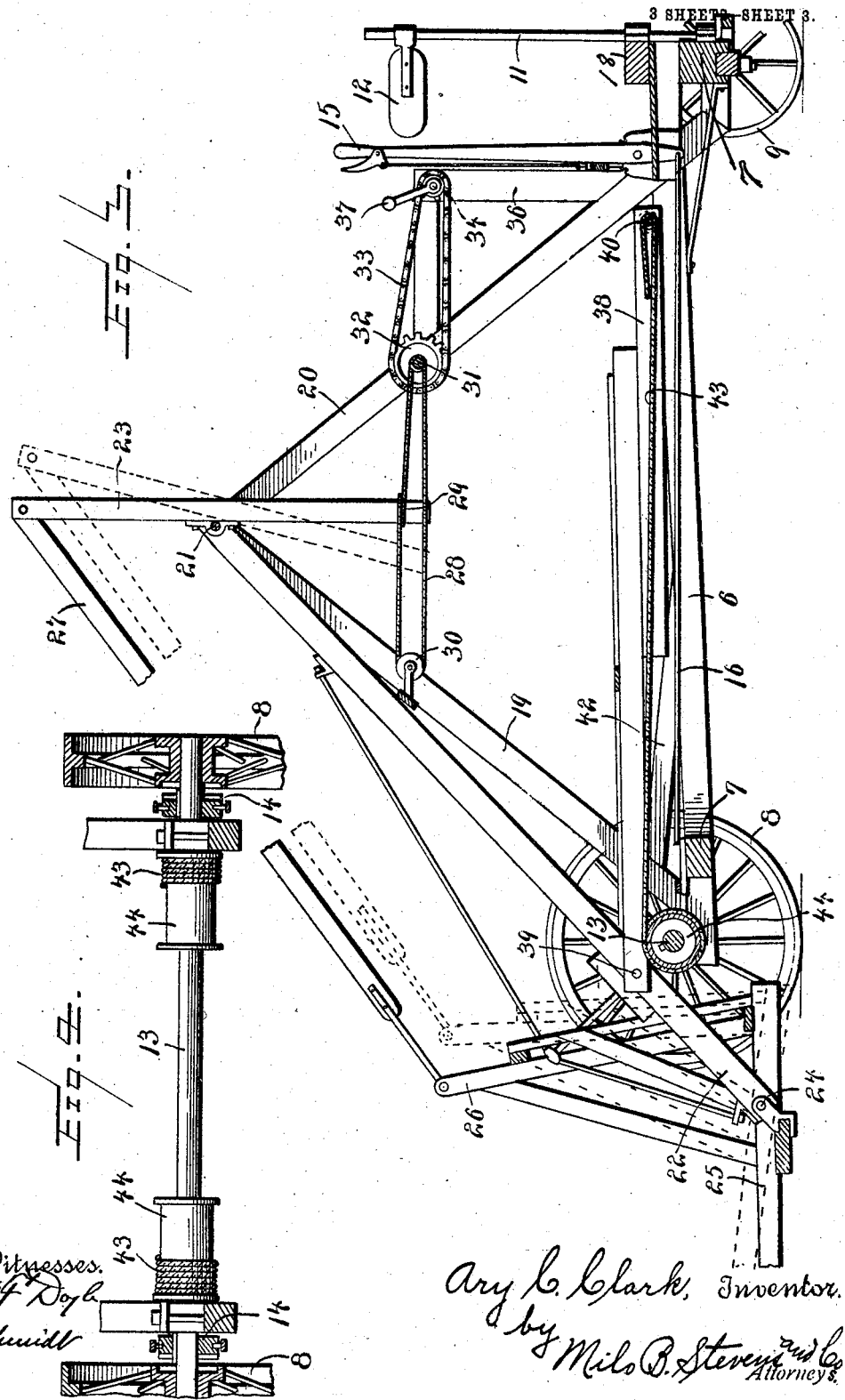

UNITED STATES PATENT OFFICE.

ARY C. CLARK, OF COZAD, NEBRASKA.

STACKER.

No. 800,266.  Specification of Letters Patent.  Patented Sept. 26, 1905.

Application filed January 27, 1905. Serial No. 242,940.

*To all whom it may concern:*

Be it known that I, ARY C. CLARK, a citizen of the United States, residing at Cozad, in the county of Dawson and State of Nebraska, have invented new and useful Improvements in Stackers, of which the following is a specification.

My invention relates to a stacker, and has for its object certain novel features of construction whereby the efficiency of the machine is increased, as will be fully described hereinafter.

A further object is to provide a stacker which shall be simple in construction, so that the attendance of only one person is required to successfully operate the same.

To this end the invention consists in an arrangement and combination of parts hereinafter described and claimed, reference being had to the accompanying drawings, in which—

Figure 1 is a side elevation of the stacker, and Fig. 2 a plan view thereof. Fig. 3 is a longitudinal section. Fig. 4 is a transverse section on the line 4 4 of Fig. 2.

Referring specifically to the drawings, the frame of the machine comprises side bars 6, connected by cross-bars 7. The machine is mounted on wheels, the front wheels being indicated at 8 and the rear wheels at 9. The latter are the steering-wheels, and they can be operated in any suitable and convenient manner. In the drawings I have shown drag-links 10 connected with a rotatable steering-post 11, provided with an outwardly-projecting wing 12, which the operator straddles to steer the machine. The front wheels are loose on an axle 13. Clutches 14 are provided to couple said wheels to the axle, for a purpose to be hereinafter described. The clutches are operated by a hand-lever 15 at the rear end of the machine, where the operator stands, the connection between the clutches and the operating-lever being rods 16 and bell-cranks 17, fulcrumed on one of the cross-bars 7. Any other suitable connection can be used. The draft-animals are hitched to the rear end of the machine, the whiffletrees and poles being secured to a draft-beam 18, extending across the rear end of the machine.

At each side of the frame is a pair of uprights 19 and 20, which are connected at the top by a transverse rod 21, on which the fork-arms 22 and a pair of levers 23 are pivotally supported. The fork-arms at their outer ends are pivotally connected, as at 24, with the fork, which comprises the usual spaced parallel bars 25, forming the teeth, which are connected and braced in any suitable manner. At its rear end the fork has a pair of upright bars 26, which are connected at their top ends to the top ends of the levers 23 by connecting-bars 27. Through this connection the fork will be tilted when the levers 23 are rocked.

The means for rocking the levers 23 comprise ropes or cables 28, fastened to the lower ends thereof, as at 29, and which ropes pass around pulleys 30, carried by the uprights 19, and around a shaft 31, journaled in the uprights 20. The shaft 31 has a sprocket-wheel 32, which is geared by a chain 33 to a sprocket-wheel 34 on a short shaft 35, journaled in standards 36. At its outer end the shaft 35 has a crank 37 for rotating it, and when this is done the levers will be tilted forwardly or rearwardly, according to the direction in which the shaft rotates. When the levers are tilted rearwardly, as shown by dotted lines in Fig. 3, the teeth of the fork will be lifted, in which position the load is carried. When the levers are tilted in the opposite direction, the teeth drop down and discharge the load.

The fork is raised and lowered by push-bars 38, which are pivotally connected at their outer ends to a transverse rod 39, extending between the fork-arms 22. The opposite ends of the push-bars are connected by a transverse rod 40, which extends outwardly beyond said bars and forms an axle for rollers 41, which travel on the side bars 6. When the fork is in its lowered position, the push-bars lie on the frame in a horizontal position, as shown in Fig. 3 and by dotted lines in Fig. 1, the rear ends thereof being supported thereon by the rollers 41 engaging the side bars 6. When the push-bars are moved forwardly, their outer ends rise and elevate the fork-arms 22, as shown in Fig. 1. The rollers travel on the side bars 6, and by inclining the latter, as shown, the push-bars are readily started. Near the front end of the side bars 6, on top thereof, are placed beams 42, which incline in an opposite direction to the side bars and on which the rollers also travel. By inclining these beams as shown the push-bars are readily started when they are returned to lower the fork.

The push-bars are operated by cables 43, which are wound on drums 44, made fast on the axle 13, and said cables pass around the rod 40 at the rear ends of the push-bars, being made fast thereto. When the cables are wound on the drums, the push-bars are drawn forwardly and elevate the fork, as already described, and when the cables are unwound the push-bars return, whereby the fork is lowered.

In the operation of the machine the fork is lowered, as shown in Fig. 3 and by dotted lines in Fig. 1. The driver stands astride the wing 12, which guides the steering-wheels. The clutches are thrown to free the axle 13 from the wheels 8. The machine is then driven to the windrows and the hay or other material gathered up in the usual manner. When the fork is loaded, the crank 37 is turned to tilt the fork, as shown by dotted lines in Fig. 3, so that the load clears the ground. The machine is then driven to the stack, and when within a short distance thereof the clutches are thrown to couple the axle 13 to the wheels 8. Upon continuing to drive the machine toward the stack cables 43 are wound on the drums 44, whereby the push-bars are drawn forwardly and the fork elevated, as already described. When the fork has been elevated sufficiently, the crank 37 is turned to push the levers 23 forwardly, which tilts the fork and dumps the load. The machine is then backed from the stack, which unwinds the cables from the drums and permits the push-bars to drop down slowly, whereby the fork is lowered to the ground. The clutches are then thrown to disengage the axle, and the machine is ready for another load. Only one attendant is necessary to operate the machine, as the clutch-lever, steering means, and fork-tilting device are within easy reach. The machine therefore results in a considerable saving of labor, and it effectively serves the purpose for which it is intended.

Having thus described my invention, what is claimed as new, and desired to be secured by Letters Patent, is—

1. A stacker comprising a supporting-frame, fork-arms pivoted thereto, a toothed frame pivoted to the arms, levers pivoted to the supporting-frame, connections between said levers and the toothed frame, a winding-shaft and a pulley, cables passing over said shaft and pulley, and fastened to the levers, and means for rotating the shaft whereby the levers are swung and the toothed frame tilted.

2. A stacker comprising a supporting-frame, fork-arms pivoted thereto, means for raising and lowering the arms, a toothed frame pivoted to the arms, levers pivoted to the supporting-frame, connections between said levers and the toothed frame, a winding-shaft and a pulley, cables passing over said shaft and pulley, and fastened to the levers, and means for rotating the shaft whereby the levers are swung and the toothed frame tilted.

In testimony whereof I have signed my name to this specification in the presence of two subscribing witnesses.

ARY C. CLARK.

Witnesses:
JOHN T. BUCKLEY,
CHAS. WAKE.